E. W. OAKLEY.
HOES.
No. 184,103.                  Patented Nov. 7, 1876.
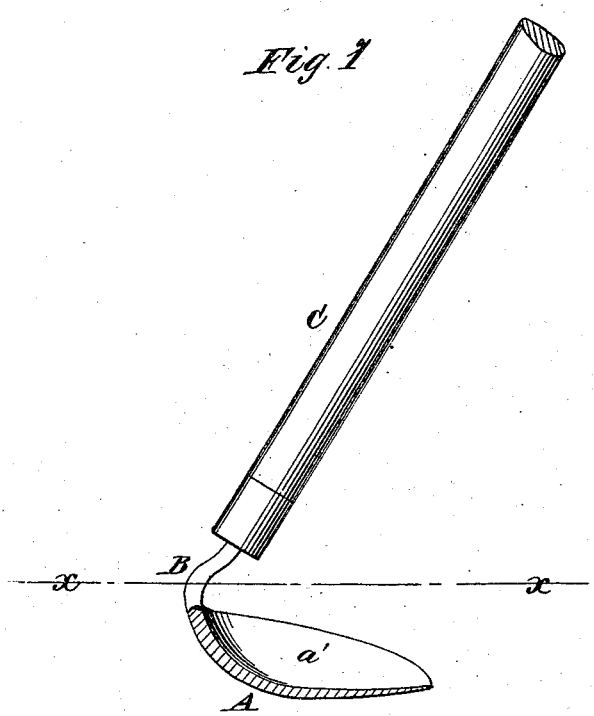
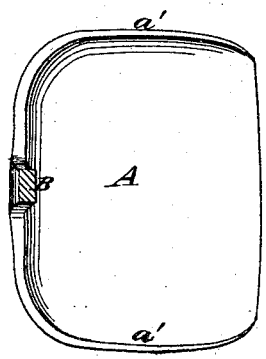
WITNESSES:
A. W. Almqvist
J. H. Scarborough
INVENTOR:
Eliphalet W. Oakley
BY
ATTORNEYS.

UNITED STATES PATENT OFFICE.

ELIPHALET W. OAKLEY, OF BABYLON, NEW YORK.

IMPROVEMENT IN HOES.

Specification forming part of Letters Patent No. 184,103, dated November 7, 1876; application filed October 7, 1876.

*To all whom it may concern:*

Be it known that I, ELIPHALET W. OAK-LEY, of Babylon, Suffolk county, New York, have invented a new and Improved Hoe, of which the following is a specification:

Figure 1 is a side view of my improved hoe, the blade being shown in section. Fig. 2 is a top view of the hoe-blade, the shank being shown in section through the line $x\ x$, Fig. 1.

Similar letters of reference indicate corresponding parts.

The object of this invention is to furnish an improved hoe for removing fine mud and sand from the bottom of ditches, and for other similar uses, and which shall be simple in construction and effective in use.

The invention consists in a hoe provided with a scoop-blade, as hereinafter fully described.

A represents the blade of the hoe, the rear part of the body of which is curved upward, and its side parts $a'$ are curved upward, giving it the form of a scoop. Upon the middle part of the rear edge of the blade A is formed a shank, B, to which the handle C is attached in the usual way.

A hoe thus formed can be used for removing fine mud and sand from the bottom of a ditch without its being all washed off by the water. The hoe can also be used for various other purposes with better effect than a hoe constructed in the usual way.

I am aware that grain shovels and scoops are shaped like my hoe-blade; but such scoops are not adapted to be drawn along the ground by a handle projecting in a forward direction, and thus form a scoop-hoe.

Having thus described my invention, I claim as new and desire to secure by Letters Patent—

The scoop-hoe herein described, consisting of the body A, shaped as shown, the shank B, and the handle C, projecting in a forward direction, as and for the purpose set forth.

ELIPHALET W. OAKLEY.

Witnesses:
JAMES T. GRAHAM,
C. SEDGWICK.